United States Patent
Esch et al.

(10) Patent No.: US 12,107,499 B2
(45) Date of Patent: Oct. 1, 2024

(54) ADAPTIVE CURRENT THRESHOLD CONTROLLED SMPS BUCK CONVERTER WITH PULSE FREQUENCY MODULATION

(71) Applicant: STMicroelectronics (Grenoble 2) SAS, Grenoble (FR)

(72) Inventors: Helene Esch, Seyssinet Pariset (FR); Alexandre Meillereux, Sassenage (FR)

(73) Assignee: STMicroelectronics (Grenoble 2) SAS, Grenoble (FR)

( * ) Notice: Subject to any disclaimer, the term of this patent is extended or adjusted under 35 U.S.C. 154(b) by 287 days.

(21) Appl. No.: 17/661,361

(22) Filed: Apr. 29, 2022

(65) Prior Publication Data

US 2022/0360172 A1     Nov. 10, 2022

(30) Foreign Application Priority Data

May 10, 2021   (FR) ...................... 2104945

(51) Int. Cl.
*H02M 3/158*     (2006.01)

(52) U.S. Cl.
CPC .................. *H02M 3/158* (2013.01)

(58) Field of Classification Search
CPC ..... G05F 1/00; G05F 1/10; G05F 1/12; G05F 1/46; G05F 1/455; G05F 1/45; G05F 1/445; G05F 1/66; G05F 1/40; G05F 1/42; G05F 1/44; G05F 1/462; G05F 1/52; G05F 1/56; G05F 3/10; G05F 3/16; G05F 3/18; G05F 3/185; G05F 3/20; G05F 3/26; G05F 3/30; G05F 3/205; G05F 3/22; G05F 3/24; G05F 3/222; G05F 3/242; G05F 3/225; G05F 3/227; G05F 3/245; G05F 3/247; G05F 3/262; G05F 3/265; G05F 3/267; G05F 1/575; H02M 5/2573; H02M 1/081; H02M 5/293; H02M 7/12; H02M 3/10; H02M 3/125; H02M 3/13; H02M 3/135; H02M 3/145; H02M 3/15; H02M 3/155; H02M 3/156; H02M 3/157; H02M 3/158; H02M 1/346; H02M 3/1588; H02M 2003/1566; H02M 3/1582; H02M 3/1584;
(Continued)

(56) References Cited

U.S. PATENT DOCUMENTS 5,959,443 A    9/1999  Littlefield
8,405,369 B1   3/2013  Kahn
(Continued)

OTHER PUBLICATIONS

Lee, Kyoungjin, et al. "A High Efficiency Wide-Load-Range Asynchronous Boost Converter with Time-Based Dual-Mode Control for SSD Applications," IEEE Asian Solid-State Circuits Conference, Nov. 7-9, 2016/Toyama, Japan, 4 pages.

*Primary Examiner* — Jeffrey A Gblende
(74) *Attorney, Agent, or Firm* — Slater Matsil, LLP

(57) ABSTRACT

The present disclosure relates to a switched-mode Power Supply Buck Converter comprising: a switch connected between a node receiving a supply potential and an internal node; another switch connected between the internal node and a node receiving a reference potential; an inductive element coupling the internal node to an output node; and a control circuit controlling the switches so that current pulses in the inductive element have a maximum value selected from among at least a first value and a second value based on an average current drawn at the output node.

21 Claims, 5 Drawing Sheets

(58) Field of Classification Search
CPC ....... H02M 2003/1557; H02M 1/0032; H02M 1/4225; H02M 7/217; H02M 1/0025; H02M 1/0045; H02M 1/0009; H02M 1/08; H02M 1/088; H02M 1/0048; H05B 39/048; B23K 11/24; H04B 2215/069
See application file for complete search history.

(56) References Cited

U.S. PATENT DOCUMENTS

| | | | |
|---|---|---|---|
| 10,715,039 B1* | 7/2020 | Ilango | G01R 19/175 |
| 11,316,423 B2* | 4/2022 | Fromme | H02M 1/38 |
| 11,404,962 B2* | 8/2022 | Neumayr | H02M 1/08 |
| 2009/0322300 A1 | 12/2009 | Melanson et al. | |
| 2019/0254133 A1* | 8/2019 | Eggermont | H02M 1/088 |
| 2020/0235667 A1 | 7/2020 | Padure | |

\* cited by examiner

ADAPTIVE CURRENT THRESHOLD CONTROLLED SMPS BUCK CONVERTER WITH PULSE FREQUENCY MODULATION

CROSS-REFERENCE TO RELATED APPLICATIONS

This application claims priority to French Application No. 2104945, filed on May 10, 2021, which application is incorporated by reference herein in its entirety.

TECHNICAL FIELD

The present disclosure generally relates to electronic circuits, and in particular embodiments, to switched-mode power supply buck converters.

BACKGROUND

Of the known switched-mode power supply (SMPS) buck converters, the converters that operate by using pulse frequency modulation (PFM) are distinguished.

In a known pulse frequency modulation converter, when the converter's output voltage decreases and moves away from a set value, energy is supplied to an inductive element during an energy accumulation phase and restored by the inductive element at the converter's output during an energy restoration phase. Each succession of an energy accumulation phase and an energy restoration phase corresponds to a current pulse in the inductive element.

In such a known PFM converter, the current pulses in the inductive element all have the same maximum value. The converter's output voltage is then regulated by modifying the current pulse frequency. In addition, the maximum current pulse value determines the maximum average current that the converter can deliver (i.e., the maximum average current that a load can draw from the converter output). This maximum average current that the converter can deliver is the high end of the range of current values over which the converter operates, with the low end corresponding to a zero or a near-zero average current.

There is a need to overcome some or all of the drawbacks of known PFM converters.

For example, there is a need to increase the range of average current values that known PFM converters can deliver, without increasing the start-up time of these converters and without increasing the amplitude of the ripples of the output voltage provided by these converters.

SUMMARY

One embodiment addresses all or some of the drawbacks of known PFM converters.

An embodiment allows increasing the maximum value of the average current that a PFM converter can deliver without increasing its start-up time and without increasing the amplitude of the ripples of the output voltage provided by the converter.

One embodiment provides for a switched-mode power supply buck converter having a first switch and a second switch. The first switch connected between a node configured to receive a supply potential and an internal node; the second switch connected between the internal node and a node configured to receive a reference potential; and an inductive element, coupling the internal node to an output node of the converter; and a control circuit, configured to control the first and second switches so that current pulses in the inductive element have a maximum value selected from at least a first value and a second value, based on an average current drawn at the output node.

One embodiment provides a control method; the method includes selecting, with a control circuit and from at least a first value and a second value, a maximum value of current pulses in an inductive element coupling an internal node of a switched-mode power supply buck converter to an output node of the converter, the selection being done based on an average current drawn at the output node; and controlling, with the control circuit, a first switch connected between a node receiving a supply potential and the internal node, and a second switch, connected between the internal node and a node receiving a reference potential, so that the maximum value of the current pulses is equal to the selected value.

According to one embodiment, the control circuit is configured to select the maximum value from among at least the first value and the second value, so that the maximum value increases when the average current increases and decreases when the average current decreases.

According to one embodiment, the first value is less than the second value; the control circuit selects the second value when the average current is greater than a first threshold; and the control circuit selects the first value when the average current is less than a second threshold, less than or equal to the first threshold.

According to one embodiment, the second threshold is less than the first threshold.

According to one embodiment, when the first value is selected at the end of each current pulse, the control circuit triggers a first temporization representative of the first threshold; and the control circuit selects the second value if a start of the next current pulse occurs during the first temporization and wherein, when the second value is selected, at the end of each current pulse, the control circuit triggers a second temporization representative of the second threshold; and the control circuit selects the first value if a start of the next current pulse occurs after the second temporization.

According to one embodiment, a duration of each first temporization is less than a duration of each second temporization.

According to one embodiment, the maximum value is selected from among at least the first value, the second value, and a third value greater than the second value.

According to one embodiment, the control circuit selects the third value when the average current is greater than a third threshold, greater than the first threshold; and the control circuit selects the second value when the average current is less than a fourth threshold, greater than the first threshold and less than or equal to the third threshold, preferably less than the third threshold.

According to one embodiment, when the second value is selected: at the end of each current pulse, the control circuit further triggers a third temporization representative of the third threshold; and the control circuit selects the third value if a start of the next current pulse occurs during the third temporization, and wherein, when the third value is selected, at the end of each current pulse, the control circuit triggers a fourth temporization representative of the fourth threshold; and the control circuit selects the second value if a start of the next current pulse occurs after the fourth temporization.

According to one embodiment, the end of each current pulse corresponds to an opening of the second switch while the first switch is open, and the start of each current pulse corresponds to a closing of the first switch while the second switch is open.

According to one embodiment, the average current is determined from the control signals of the first and second switches.

According to one embodiment, the average current is determined by a delay between each two successive current pulses.

According to one embodiment, the first and second switches are controlled in pulse frequency modulation, PFM.

According to one embodiment, at each current pulse, a duration of the on-state of the first switch is determined by a comparison of a first voltage ramp with a first potential determined by a set value of an output potential of the converter, a duration of the on-state of the second switch is determined by a comparison of a second voltage ramp with a second potential determined by the set value, the slopes of the first and second voltage ramps differing according to the value selected as the maximum value.

BRIEF DESCRIPTION OF THE DRAWINGS

For a more complete understanding of the present disclosure and the advantages thereof, reference is now made to the following descriptions taken in conjunction with the accompanying drawings, in which.

DETAILED DESCRIPTION OF ILLUSTRATIVE EMBODIMENTS

Like features have been designated by like references in the various figures. In particular, the structural or functional features that are common among the various embodiments may have the same references and may dispose identical structural, dimensional and material properties.

For the sake of clarity, only the operations and elements that are useful for an understanding of the embodiments described herein have been illustrated and described in detail. In particular, the conventional electronic systems and applications that comprise a PFM converter have not been described, with the described embodiments, implementation modes and variants being compatible with these conventional electronic systems and applications. In addition, not all conventional conditions for generating a current pulse in the inductive element of a PFM converter have been described, with the embodiments described being compatible with these conventional conditions and implementations for verifying such conditions.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless indicated otherwise, when reference is made to absolute positional qualifiers, such as the terms "front," "back," "top," "bottom," "left," "right," etc., or to relative positional qualifiers, such as the terms "above," "below," "higher," "lower," etc., or to qualifiers of orientation, such as "horizontal," "vertical," etc., reference is made to the orientation shown in the figures.

Unless specified otherwise, the expressions "around," "approximately," "substantially," and "in the order of" signify within 10% and preferably within 5%.

Figure 1:
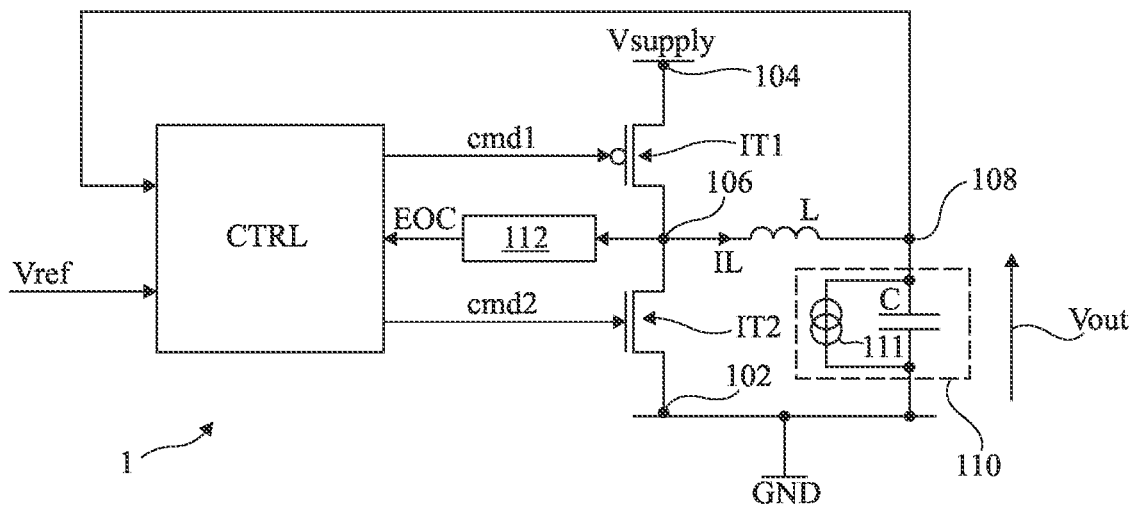
FIG. 1 is a schematic diagram of an embodiment pulse frequency modulation (PFM) converter.

FIG. 1 shows one embodiment of a PFM converter 1 very schematically. The converter 1 is configured to provide a DC output potential Vout from a DC supply potential Vsupply. Both potentials are referenced to a reference potential GND, such as ground. The value of the potential Vout is lower than that of the potential Vsupply.

The converter 1 is configured to provide the potential Vout so that it is equal to a set value. The converter 1 receives this set value as a potential Vref representative of the set value. The potential Vref is referenced to the potential GND.

In the remainder of the description, by way of example, the value of the potential Vref is considered equal to the set value of the potential Vout. Thus, the comparison of the value of a given potential with the set value can be made directly by comparing this potential and the potential Vref. However, the person skilled in the art can adapt the following description to the case where the value of the potential Vref is lower than the set value of the potential Vout. In this case, the value of a given potential with the set value can be compared by dividing this potential using a voltage divider bridge, for example, to obtain an intermediate potential representative of the value of this given potential. This intermediate potential is then compared with the potential Vref, which amounts to comparing the value of the potential Vout with its set value.

The converter 1 includes a switch IT1, connected between a node 104, configured to receive the potential Vsupply, and an internal node 106. In an embodiment, the switch IT1 is implemented by a metal oxide semiconductor (MOS) transistor, such as a P-channel MOS transistor.

The converter 1 further includes a switch IT2, connected between the node 106 and a node 102, configured to receive the GND potential. In an embodiment, the switch IT2 is implemented by a MOS transistor such as an N-channel MOS transistor.

The converter 1 includes an inductive element L, connected between the node 106 and an output node 108 of the converter 1. The converter 1 is configured to provide the potential Vout on the node 108.

A capacitor C is connected between the node 108 and the node 102. According to one example, this capacitor C is entirely part of the converter 1. According to another example, the capacitor C corresponds to an equivalent capacitor of an output capacitor of the converter 1 and an input capacitor of a load no, connected between the nodes 108 and 102 and powered by the converter 1. In FIG. 1, a current source in shows the current drawn by the load no on the node 108, the current source in being connected between the node 108 and the node 102 in parallel to the capacitor C.

Conventionally, in a PFM converter, during an energy accumulation phase in the inductive element L, the switch IT1 is on, and the switch IT2 is off. Conversely, during an energy restoration phase by the element L at the node 108, the switch IT1 is off, and the switch IT2 is on. Each succession of an energy accumulation phase and an energy restitution phase corresponds to a pulse of a current IL in the inductive element L.

The converter 1 includes a control circuit CTRL. The circuit CTRL is configured to control the switches IT1 and IT2. More specifically, the circuit CTRL is configured to control the switches IT1 and IT2 in pulse frequency modulation. The circuit CTRL provides a control signal cmd1 to the switch IT1 and a control signal cmd2 to the switch IT2. In an embodiment, the signal cmd1 is a binary signal, at "low" to turn on switch IT1 and at "high" to turn off the switch IT1, with the signal cmd2 being a binary signal, at "high" to turn on the switch IT2, and at "low" to turn off the switch IT2. However, the present description is not limited to these control signal examples.

As one example, the circuit CTRL is configured to control the start of a current pulse IL in the element L when the value of the potential Vout becomes less than a threshold Vout_th, determined or equal to the set value of the potential Vout, for example. Thus, the circuit CTRL is configured to receive the potentials Vout and Vref.

Preferably, when the value of the potential Vout becomes less than the threshold Vout_th, the circuit CTRL is configured to start a current pulse IL because the current IL in the element L is zero. The circuit CTRL is configured to control the start of a pulse only if the potential Vout is below the threshold Vout_th and the current IL is zero. In this case, as illustrated in FIG. 1, the circuit CTRL is configured to receive an EOC signal indicating when the current IL is zero. As one example, the EOC signal is provided by a circuit 112 of the converter 1, the circuit 112 being connected to the node 106, for example.

In the present description, the circuit CTRL is configured to control the switches IT1 and IT2 so that current pulses IL in the element L have a maximum value Valmax selected from two values val1 and val2, based on an average current Im drawn at the node 108 by the load no.

The circuit CTRL is configured to select either of the values val1 and val2 based on the value of the current Im, and to then control the switches IT1 and IT2 so that each current pulse IL has a maximum value Valmax equal to the selected value val1 or val2.

The circuit CTRL allows the maximum value valmax of the current pulses IL to be adapted, depending on the current value Im. Preferably, this adaptation of the value valmax of the pulses IL is discrete (i.e., the value valmax cannot vary continuously), depending on the value of the current Im, or, put differently, the value valmax can only have discrete values.

The fact that the current pulses IL can have two maximum values val1 and val2 differs from that known in conventional PFM converters, where the maximum current pulse value in the inductive element of these converters remains the same regardless of the value of the average current drawn by a load connected to their output.

According to one embodiment, the control circuit is configured to select the maximum value valmax from the values val1 and val2 so that the maximum value valmax of the current pulses IL increases when the average current increases and decreases when the average current decreases.

Considering that the value val2 is greater than the value val1, when the value valmax of the pulses is equal to the value val1 (i.e., the selected value val1 or val2 is the value val1) and the current Im increases, the circuit CTRL is configured to select the value val2, so that the value valmax increases. Conversely, when the value valmax is equal to val2 and the current Im decreases, the circuit CTRL is configured to select the value vale, so that the value valmax decreases.

As a result, for low values of the current Im relative to high values of the current Im, the current pulses IL have a low maximum amplitude valmax relative to a high maximum amplitude valmax that the current pulses IL have for the high values of the current Im.

Thus, the maximum amplitude of the current pulses IL is low when the load no draws a low value average current Im, which reduces the ripple amplitude of the potential Vout, as compared to where the maximum amplitude of the current pulses IL is constant and high. Furthermore, when the maximum amplitude of the current pulses IL is high, the maximum value of the current Im that the load no can draw from the node 108 without losing regulation of the potential Vout at its set value is higher than where the maximum amplitude of the current pulses IL is constant and low. In fact, the maximum value of the current Im that the load no can draw from the node 108 without losing regulation of the voltage Vout at its set value is equal to half the maximum value of the amplitude of the current pulses IL.

To increase the maximum value of the current Im in a PFM converter having current pulses IL of constant maximum amplitude, increasing the constant maximum amplitude of the IL current pulses might be considered. But in such a case, if the current Im drawn by the load no were small, at least two times smaller than the maximum current Im, for example, this would lead to large amplitude variants in the voltage Vout, which is not desirable. To reduce the amplitude of these ripples of the voltage Vout, increasing the value of the capacitor C might be considered. However, this would considerably increase the start-up time of the converter 1, since the time required to charge the capacitor C until the potential Vout is equal to its set value would be longer. In addition, this would lead to an increase in the overall footprint of the converter 1 and the capacitor C, which is undesirable.

According to one embodiment in which the value val1 is less than the value val2, the circuit CTRL is configured to select the value val2 when the current Im is greater than a threshold th1, and to select the value val1 when the current Im is less than a threshold th2, the threshold th2 being less than or equal to threshold th1.

According to one embodiment, the threshold th2 is lower (i.e., strictly lower here) than the threshold th1, thus suppressing possible instabilities in the maximum value valmax of the current pulses IL that could occur when the thresholds th1 and th2 are equal and the value valmax switches between the values val1 and val2.

Figure 2:
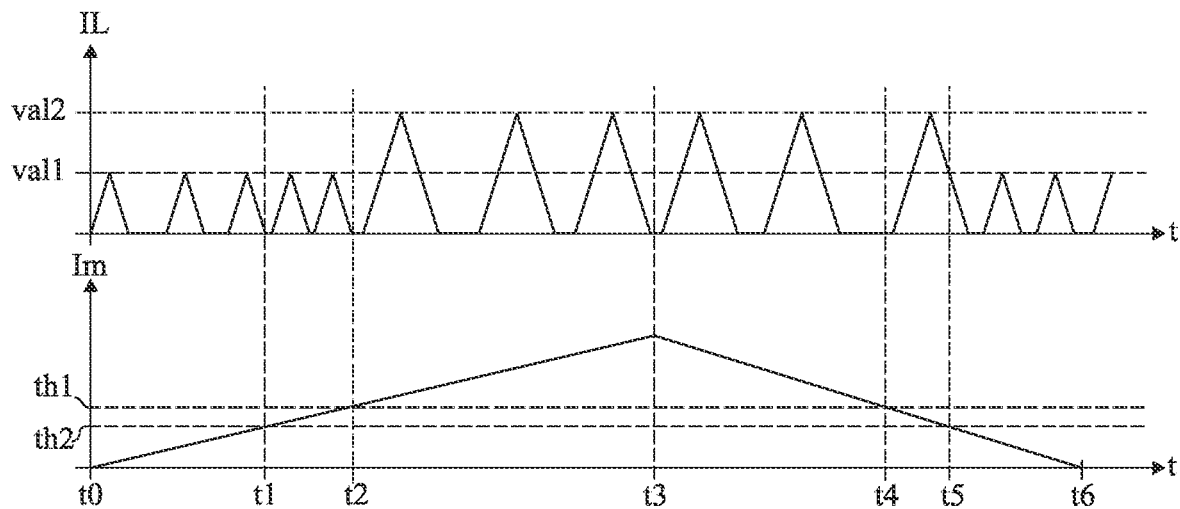
FIG. 2 are timing diagrams corresponding to an embodiment control method.

FIG. 2 shows timing diagrams illustrating one embodiment of the control method implemented in the converter 1 of FIG. 1, and, more particularly, of the method for controlling switches IT1 and IT2, this method being implemented by the circuit CTRL.

FIG. 2 shows the evolution of the current IL (top in FIG. 2) and the average current Im (bottom in FIG. 2) depending on the instant t.

In the example shown in FIG. 2, the threshold th2 is lower than the threshold th1, although these thresholds may be equal in other examples not shown.

In the example of FIG. 2, the current Im is less than the thresholds th1 and th2 at an instant to, whereby the current pulses IL have a maximum value valmax equal to the value val1.

At an instant t1 subsequent to the instant to, the current Im becomes greater than the threshold th2. However, as the threshold th2 is lower here than the threshold th1, and as the current Im at the instant t1 is still lower than the threshold th1, the maximum value valmax of the current pulses IL remains equal to the value val1.

At an instant t2 subsequent to the instant t1, the current Im becomes equal to and then greater than the threshold th1. The value val2 is then selected, and, from the instant t2, the maximum value valmax of the current pulses IL is equal to val2.

In the example of FIG. 2, the current Im increases from the instant to until the instant t3 subsequent to the instant t2. Thus, between the instant to and the instant t2, the frequency of the current pulses IL increases. Furthermore, this frequency changes, decreases, for example, when the maximum value valmax of the current pulses IL switches from the value val1 to the value val2. From the instant t2 to the instant t3, the frequency of the current pulses IL increases.

At an instant t4 subsequent to the instant t3, the current Im becomes lower than the threshold th1. However, since the threshold th2 is lower here than the threshold th1 and, at the instant t3, the current Im is still higher than the threshold th2, the maximum valmax of the current pulses IL remains equal to the val2.

At an instant t5 subsequent to the instant t4, the current Im becomes lower than the threshold th2. The value val1 is then selected, and, from the instant t4, the maximum value valmax of the current pulses IL is equal to val1.

In the example of FIG. 2, the current Im decreases from the instant t3 until the instant t6 subsequent to the instant t5. Thus, between the instant t3 and the instant t5, the frequency of the current pulses IL decreases. Furthermore, this frequency changes, increases for example, when the maximum value valmax of the current pulses IL switches from the value val2 to the value val1. From the instant t5 to the instant t6, the frequency of the current pulses IL decreases.

Although not detailed above, each current pulse IL starts with the closing of the switch IT1 while switch the IT2 is open. The current IL then increases until it reaches the selected value valmax (val1 between instants t0 and t2, and between instants t5 and t6; val2 between instants t2 and t5). The moment when the current IL reaches the selected value valmax corresponds to the moment when the switch IT1 is switched off and the switch IT2 is switched on. The current IL then decreases until it cancels. The moment when the current cancels corresponds to the moment when the switch IT2 is switched to the open state.

Figure 3:
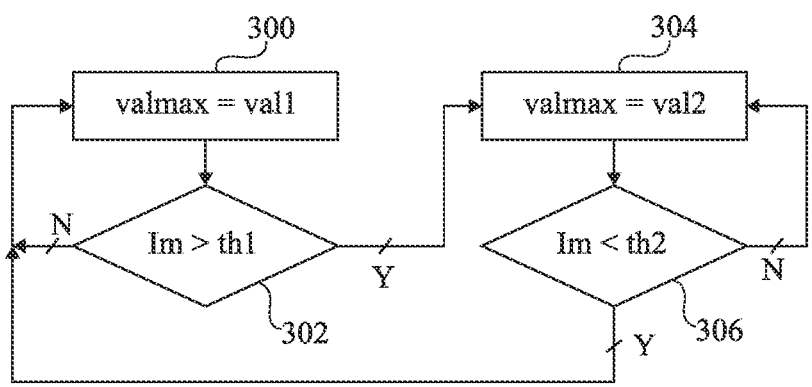
FIG. 3 is a flow chart of an embodiment method.

FIG. 3 shows the method illustrated by the timing diagrams of FIG. 2, in the form of a flow chart.

At a step 300 ("valmax=val1" block), valmax is equal to val1, or put differently, the circuit CTRL (FIG. 1) has selected val1 as the maximum value valmax of the current pulses IL.

Step 300 is followed by a step 302 ("Im>th1" block), in which the circuit CTRL compares the current Im to the threshold th1.

If the current Im is less than the threshold th1 (output N of step 302), the method continues at step 300 and valmax remains equal to val1.

If the current Im is greater than the threshold th1 (output Y of step 302), the method continues at a step 304 ("valmax=val2" block).

In step 304, the valmax becomes equal to the value val2, or, put differently, the circuit CTRL selects val2 as the maximum value valmax.

Step 304 is followed by a step 306 ("Im<th2" block), in which the circuit CTRL compares the current Im to the threshold th2.

If the current Im is greater than the threshold th2 (output N of step 306), the method continues at step 304 and the valmax remains equal to the val2.

If the current Im is less than the threshold th2 (output Y of step 306), the method continues at step 300 where the value valmax becomes equal to the value val1, or, the circuit CTRL selects the value val1 as the maximum value valmax.

Although the case where the threshold th2 is less than the threshold th1 has been described in connection with FIG. 2, the person skilled in the art is able to adapt the above method to the case where the thresholds th1 and th2 are equal.

Figure 4:
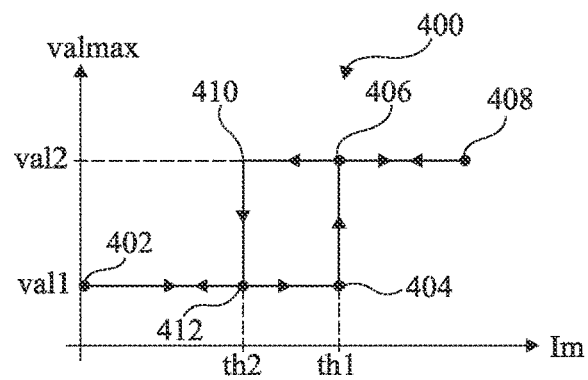
FIG. 4 is a chart corresponding to an embodiment method.

FIG. 4 illustrates an example implementation of the method of FIGS. 2 and 3, in the form of a curve 400. More particularly, FIG. 4 illustrates the evolution of the maximum value valmax of the current pulses IL depending on the value of the average current Im, in an example where the threshold th2 is lower than the threshold th1.

As the current Im increases from a value below the thresholds th1 and th2 (point 402 on the curve 400), valmax remains equal to val1 until the current value Im reaches the threshold th1 (point 404 on the curve 400). When the current value Im continues to increase above the threshold th2, the valmax becomes equal to the value val2 (point 406 of the curve 400).

Conversely, when the current Im decreases from a value above the thresholds th1 and th2 (point 408 of the curve 400), the valmax remains equal to the value val2 until the current value Im reaches the threshold th2 (point 410 of the curve). When the current value Im continues to decrease below the threshold th2, the valmax becomes equal to the val1 (point 412 of the curve 400).

Thus, because the threshold th2 is strictly less than threshold th1, there is a hysteresis on the changes of the value valmax between the values val1 and val2, which allows instabilities in the value valmax to be reduced as compared to where the thresholds th1 and th2 are equal.

To implement the method described above, the converter 1 (FIG. 1) includes a circuit, for example, configured to measure the evolution of the current IL, depending on the time, and to provide a signal representative of the value of the average current Im drawn at the node 108 by the load 110. However, such a circuit may be cumbersome and may degrade converter performance, when the current IL is measured through a resistor connected in series with the element L between the nodes 104 and 108, for example.

It is proposed here to take advantage of the fact that the frequency of the current pulses IL, and, more particularly, the difference between the end of a current pulse IL and the start of the next current pulse IL, is an information representative of the value of the current Im. Indeed, for a given value valmax, this frequency increases or decreases when the respective current Im increases or decreases. As such, the gap between two successive current pulses IL increases or decreases when the respective current Im increases or decreases.

Figure 5:
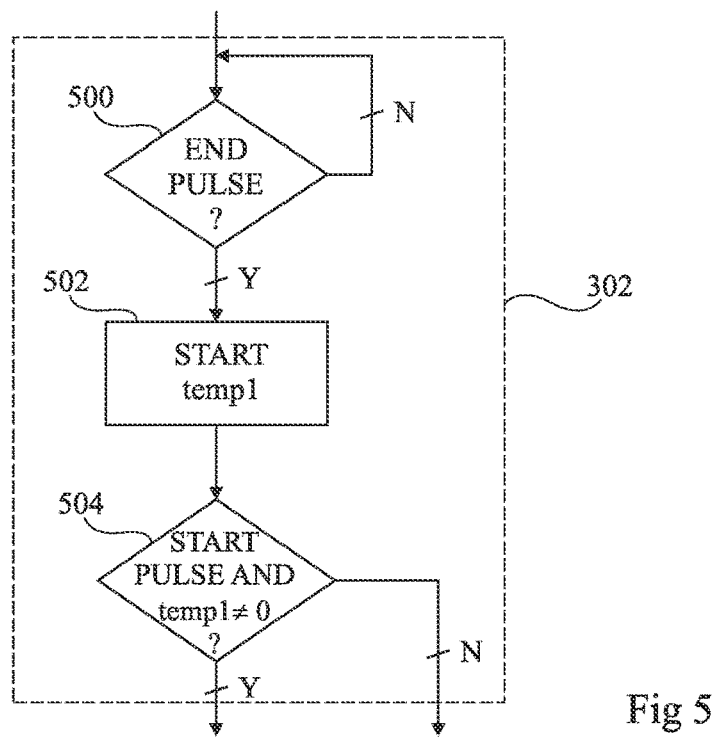
FIG. 5 is a flow chart of an embodiment method.

FIG. 5 shows one embodiment of step 302 of the method of FIG. 3, in the form of a flowchart. In this embodiment, the start and end times of the current pulses IL are used to estimate or determine the current Im, or to obtain an information representative of the value of the current Im. In an embodiment, this step 302 is implemented by the circuit CTRL (FIG. 1).

Step 302 begins with a step 500 ("END PULSE?" block). Step 500 consists of waiting for the end of a current pulse IL. Step 500 is repeated (output N of step 500) until the end of a current pulse IL, and more precisely, until an instant when that pulse ends.

When a current pulse IL ends (output Y of step 500), the method continues to step 502 (block "START temp1"), where a temporization temp1 starts.

The method continues at step 504 (block "START PULSE AND temp1≠0?"). Step 504 involves waiting for the start of a subsequent current pulse IL, and, more specifically, the start of the current pulse IL following the current pulse IL, the end of which caused the start of the timer temp1. Furthermore, when this next current pulse IL starts, if the temporization temp1 has ended (output N of step 504 and step 302 in FIG. 3), such that the current Im is below the threshold th1. Conversely, if the temporization temp1 has not ended when this next current pulse IL starts (output Y of step 504 and step 302), such that the current Im is greater than the threshold th1. Thus, in the embodiment of step 302 described in connection with FIG. 5, the duration or temporization temp1 is representative of the threshold th1.

Figure 6:
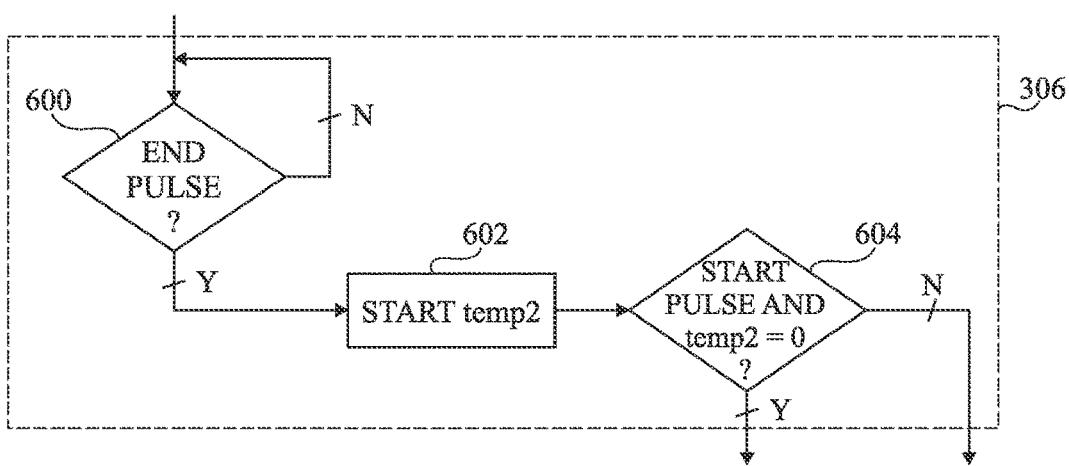
FIG. 6 is a flow chart of an embodiment method.

FIG. 6 shows one embodiment of step 306 of the method of FIG. 3, in the form of a flowchart. In this embodiment, the start and end times of the current pulses IL are used to estimate the current Im. Step 306 begins with a step 600 ("END PULSE" block). Like step 500 (FIG. 5), step 600 consists of waiting for the end of a current pulse IL. Step 600 is repeated (output N of step 600) until the end of a current pulse IL, and, more precisely, until an instant when this pulse ends. When the current pulse IL ends (output Y of step 600), the method continues to step 602 ("START temp2" block), at which a temporization temp2 starts.

The method continues at a step 604 (block "START PULSE AND temp2=0?"). Step 604 consists of waiting for the start of a subsequent current pulse IL, and more precisely the start of the current pulse IL following the current pulse IL, the end of which caused the start of the temporization temp2. Furthermore, if the temporization temp2 has ended when this next current pulse IL begins (output Y of step 604 and step 306), such that the current Im is below the threshold th2. On the other hand, if the temporization temp2 has not ended when this next IL current pulse begins (output N of step 604 and step 306), such that the current Im is greater than the threshold th2. Thus, in the embodiment of step 306 described in connection with FIG. 6, the duration or temporization temp2 is representative of the threshold th2.

Figure 7:
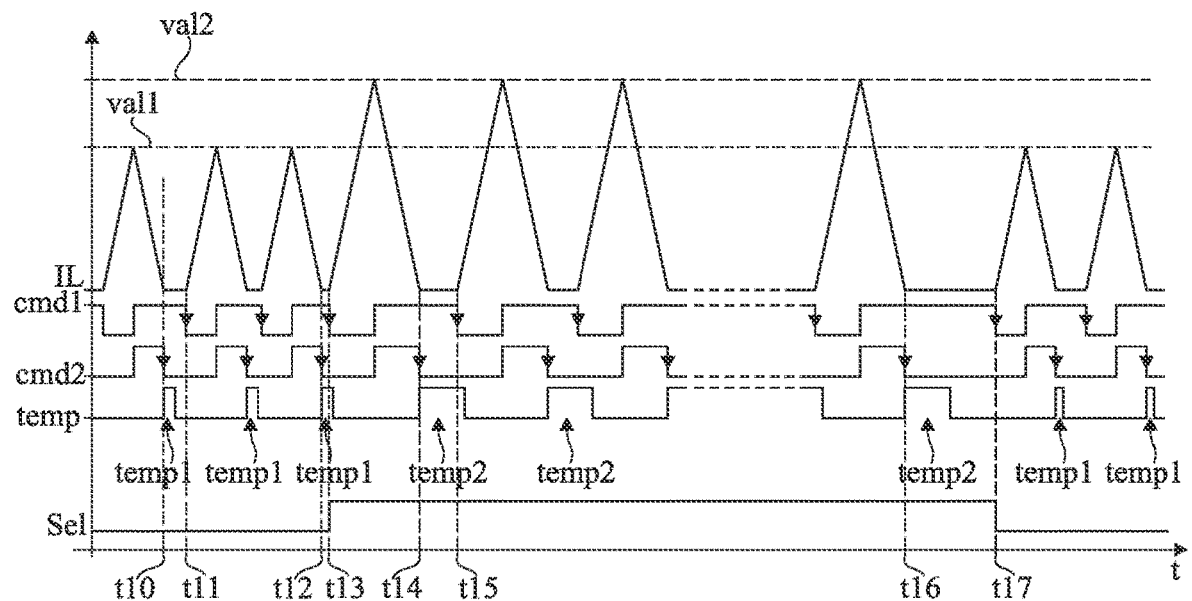
FIG. 7 are timing diagrams corresponding to an embodiment method.

FIG. 7 illustrates an implementation of the method of FIG. 3 with the steps described in connection with FIGS. 5 and 6, using timing diagrams. More particularly, FIG. 7 illustrates the evolution of the current IL, the control signals cmd1 and cmd2 for the switches IT1 and IT2, a temporization signal temp and a signal Sel, depending on the time t.

The signal Sel is a digital signal whose state indicates the current value val1 or val2 of the maximum value valmax of the current pulses. In an embodiment, the signal Sel is a binary signal with a first state, the low state in the example of FIG. 7, indicating that the value val1 is selected as the maximum value valmax of the current pulses IL, and with a second state, the high state in the example of FIG. 7, indicating that the value val2 is selected as the maximum value valmax of the current pulses IL.

Furthermore, in the example of FIG. 7, the switch IT1 (FIG. 1) is considered on or off respectively when the respective signal cmd1 is low or high, with the switch IT2 (FIG. 1) considered on or off respectively when the respective signal cmd2 is high or low.

The person skilled in the art can provide other examples where the high and low levels of the signal cmd1 or the signal cmd2 or the signal Sel are different from that indicated here as an example.

At an instant t10, the signal Sel is in a low state, indicating that the maximum value valmax of the current pulses IL is equal to the value val1. The instant t10 corresponds to the end of a current pulse IL (step 500, FIG. 5). Advantageously, in the example of FIG. 7, the end of a current pulse IL is detected by the switching off of the signal cmd2 that commands the switching of the switch IT2, i.e. switching the signal cmd2 to low in this example. The instant t10 corresponds, moreover, to the start of the temporization temp1 (step 502, FIG. 5). In this example, this corresponds to switching the signal temp to the high state.

At a subsequent instant t11, the next current pulse IL starts (step 504, FIG. 5). Advantageously, in the example of FIG. 7, the start of a current pulse IL is detected by the switching on of the signal cmd1 that controls the switching of the switch IT1 (i.e., switching the signal cmd1 to low in this example). Furthermore, at the instant t11, the temporization temp1 has ended, with the signal temp being in the low state in this example. Thus, the value valmax remains equal to val1 (output N of step 504 in FIG. 5 and of step 302 in FIG. 3).

At an instant t12 subsequent to the instant t11, a current pulse IL ends, the end of this pulse being detected by the switching of the signal cmd2 to low in this example. As the value valmax is equal to the value val1, this leads to the start of the temporization temp1.

At a subsequent instant t13, the next current pulse IL starts, the start of this next current pulse IL being detected by the switching of the signal cmd1 to low in this example. As the temporization temp1 has not ended at the instant t13 (signal temp high), this causes the value val2 to be selected as the new maximum value valmax of the current pulses IL (output Y of step 504 in FIG. 5 and step 302 in FIG. 3). Thus, the signal Sel switches to the high state at the instant t13 in this example.

From the instant t13, the switches IT1 and IT2 are controlled so that the maximum value valmax of the current pulses, in particular the one starting at instant t13, is equal to the value val2.

At an instant t14 subsequent to the instant t13, the current pulse IL that started at the instant t12 ends (step 600, FIG. 6), the end of this current pulse corresponding to the signal cmd2 switching to low in this example. Since the value valmax is now equal to the value val2 (Sel high signal), this causes the start of the temporization temp2 (step 602, FIG. 2).

At a subsequent instant t15, the next current pulse IL starts (step 604, FIG. 6), the start of this current pulse Il corresponding to the switching of the signal cmd1 to low in this example. As the temporization temp2 has not ended at the instant t15, the value valmax remains unmodified and equal to the value val2 (the output N of step 604 in FIG. 6 and step 306 in FIG. 3).

At an instant t16 subsequent to the instant t15, while the value valmax is still equal to the value val2, a current pulse IL ends and the temporization temp2 starts.

The next current pulse IL starts at an instant t17 subsequent to the instant t15, when the temporization temp2 has ended. This causes the value val1 to be selected as the new maximum value valmax of the current pulses IL (output Y of step 604 in FIG. 6 and step 306 in FIG. 3). Thus, the signal Sel switches to the low state at the instant t17, in this example.

In an embodiment, as shown in FIG. 7, the duration of the temporization temp1 is less than that of the temporization temp2.

Figure 8:
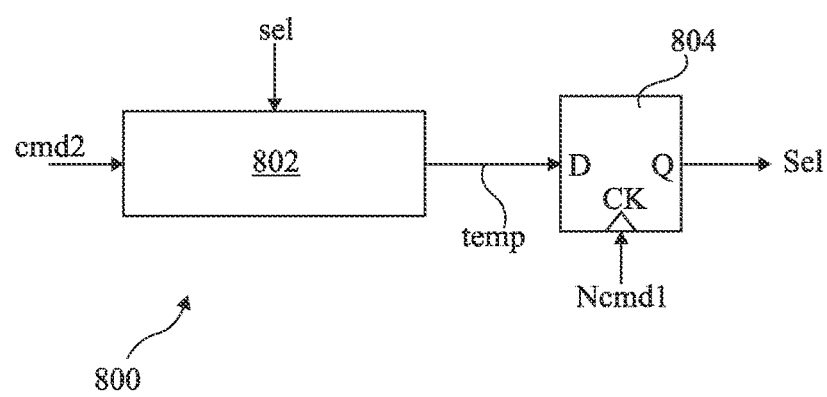
FIG. 8 is a block diagram of an embodiment circuit.

FIG. 8 shows an example embodiment of a circuit 800 configured to implement the steps of FIGS. 5 and 6 (i.e., to implement the method illustrated in FIG. 7). In an embodiment, in FIG. 8, the respective high or low state of the signal cmd1 controls the respective off or on state of the switch IT1, the respective high or low state of the signal cmd2 controls the respective on or off state of the switch IT2, the high or low state of the signal Sel indicates that the value valmax is equal to the respective value, val2 or val1, and a temporization temp1 or temp2, depending on the value of the signal Sel, starts with switching the signal temp to high and ends with switching the signal temp to low.

As one example, the circuit 800 is part of the circuit CTRL (FIG. 1). The circuit 800 receives the signals cmd1 and cmd2 and provides the signal Sel. In addition, the circuit 800 uses the signal Sel to determine which value, val1 or val2, is selected as the current maximum value valmax of the current pulses IL.

The circuit 800 includes a circuit 802 configured to receive the signal cmd2 and indicate the selected value, val1 or val2 (i.e., the signal Sel in this example). The circuit 800 is further configured to provide the temporizations temp1 and temp2, as the signal temp in this example.

More particularly, in this example, when the signal cmd2 switches to "low," the circuit 802 switches the temp signal to "high" for a duration corresponding to the duration of the temporization temp1 if the signal Sel is low and for a duration corresponding to the duration of the temporization tempt if the signal Sel is high.

The circuit 800 further includes a D flip-flop 804. The flip-flop 804 has a data input D configured to receive the signal temp. The flip-flop 804 further includes a timing input CK and an output Q. The state of the input D is copied to the output Q on each edge, rising in this example, of the signal received through its input CK, and the output level is maintained (stored) until the next edge, rising in this example, on its input CK. More particularly, in this example, the input CK of the flip-flop 804 is configured to receive a signal Ncmd1 complementary to the signal cmd1, with the signal Ncmd1 respectively being low or high when the signal cmd1 is in the respective high or low state. Thus, each falling edge of the signal cmd1 causes an update of the output Q of the flip-flop 804. As a result, the circuit 800 provides the signal Sel described in connection with FIG. 7.

Depending on the signal Sel, the circuit CTRL (FIG. 1) then adapts the durations of the "on" states of the switches IT1 and IT2 so that the maximum value valmax of the current pulses IL is equal to the selected value val1 or val2 (i.e., the value val or val2 indicated by the signal Sel). The person skilled in the art can provide other embodiments of circuits for implementing the steps of FIGS. 5 and 6.

Figure 9:
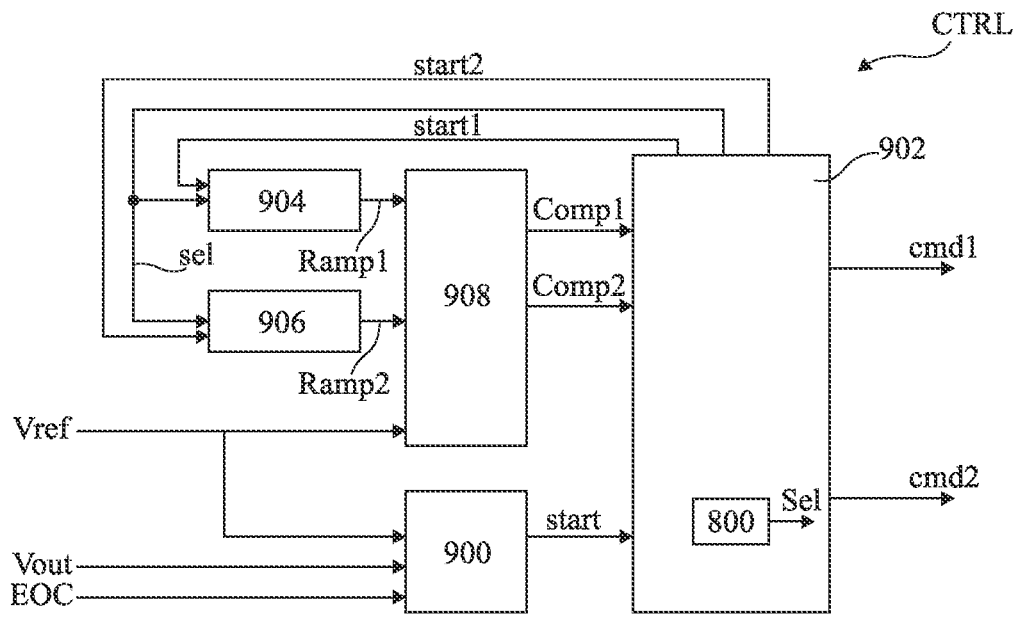
FIG. 9 is a block diagram of an embodiment converter.

FIG. 9 shows a more detailed example of one embodiment of the converter 1 of FIG. 1, with only the circuit CTRL of the converter 1 shown in FIG. 9. The circuit CTRL receives the potential Vout, the potential Vref, and, preferably, the EOC signal. The circuit CTRL includes a circuit 900 configured to receive the potentials Vref and Vout, and, preferably, the EOC signal. The circuit 900 is configured to provide a start signal whose state, such as a switch from a low state to a high state, indicates that the circuit CTRL is to control a current pulse IL in the element L (FIG. 1).

The circuit CTRL includes a digital circuit 902, such as a state machine, receiving the start signal and providing the signals cmd1 and cmd2.

The circuit 902 is configured to provide a signal indicating which value val1 or val2 is selected as the current value valmax of the current pulses IL, such as the signal Sel. In an embodiment, the circuit 902 includes the circuit 800 of FIG. 8 for generating the signal Sel.

In this embodiment, the durations of the "on" states of the switches IT1 and IT2 are determined by voltage ramp comparisons with a potential or potentials determined by the potential set value Vout.

In an embodiment, the circuit CTRL includes a circuit 904 configured to provide voltage ramps Ramp1, and a circuit 906 configured to provide voltage ramps Ramp2.

When the circuit 902, and more generally the circuit CTRL, is to control a current pulse IL in the element L, the circuit 902 controls the start of a voltage ramp Ramp1 using a signal start1 that it provides to the generator 904 of the voltage ramp Ramp1, for example.

A circuit 908 of the circuit CTRL compares the voltage ramp Ramp1 with a potential such as the potential Vref, determined by the set value of the potential Vout. The circuit 908 provides the result of this comparison to the circuit 902, in the form of a signal Comp1, for example.

In an embodiment, the ramp Ramp1 increases from a zero value, and the signal Comp1 is at "low" as long as the ramp Ramp1 is below the potential Vref, and then switches to "high" when the ramp Ramp1 becomes greater than the potential Vref.

In an embodiment, the circuit 902 switches the signal cm& at the start of the ramp Ramp1, and switches it again when the ramp Ramp1 becomes greater than the potential Vref.

Thus, the slope of the ramp Ramp1, together with the potential Vref, determines the duration of the "on" state of the switch IT1, thus the maximum value valmax of the current pulses IL.

In this embodiment, the ramp generator 904 is thus configured to receive the signal Sel and to modify the slope of the voltage ramps Ramp1 that it provides based on the signal Sel.

Furthermore, when the circuit 902 switches the signal cmd1 to switch the switch IT1 to the off state, it simultaneously controls the start of a voltage ramp Ramp2, for example, through a signal start2 that it provides to the generator 906 of the voltage ramp Ramp2.

The circuit CTRL 908 compares the voltage ramp Ramp2 with a potential determined by the set value of the potential Vout. In an embodiment, the ramp Ramp2 is compared with the potential Vref when the ramp Ramp2 increases from a zero value, or with a potential equal to the potential Vsupply minus the potential Vref when the ramp Ramp2 decreases from the potential Vsupply.

In embodiments, the circuit 908 provides the result of this comparison to the circuit 902, in the form of a signal Comp2.

In an embodiment, the ramp Ramp2 increases from a zero value, and the signal Comp2 is at "low" as long as the ramp Ramp2 is below the potential Vref, and then switches to "high" when the ramp Ramp2 becomes greater than the potential Vref.

In an embodiment, the circuit 902 switches the signal cmd2 at the start of the ramp Ramp2, and switches it back when the ramp Ramp2 becomes greater than the Vref potential. Thus, the slope of the Ramp2 ramp, along with the Vref potential, determines the duration of the "on" state of the switch IT2.

The duration of the "on" state of the switch IT2 must be adapted according to the value val1 or val2 selected as valmax for the current IL to be zero at the end of the "on" state of the switch IT2. In this embodiment, the ramp generator 906 is therefore configured to receive the signal Sel and to modify the slope of the voltage ramps Ramp2 that it provides, based on the signal Sel.

Figure 10:
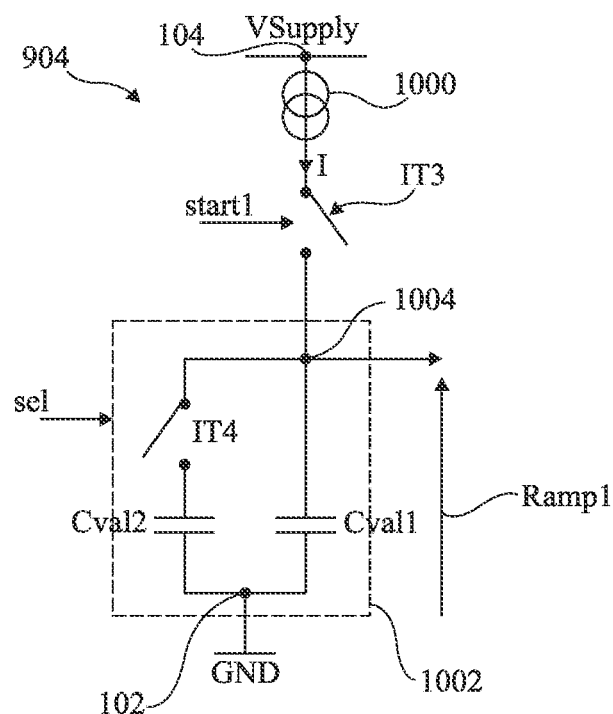
FIG. 10 is a block diagram of an embodiment ramp generator of a converter.

FIG. 10 shows an exemplary embodiment of a ramp generator of the converter of FIG. 9, such as ramp generator 904. The person skilled in the art will be able to deduce a corresponding example embodiment of the ramp generator 906 from the description made below of the ramp generator 904.

The ramp generator 904 includes a current source 1000, a switch IT3 and a controllable value capacitor 1002. The current source 1000 and the switch IT3 are connected in series between the node 104 receiving the potential Vsupply and one electrode 1004 of the capacitor 1002, with the other electrode of the capacitor 1002 connected to the node 102 receiving the reference potential GND. The voltage ramp Ramp1 is available across the capacitor 1002, or, put differently, across the terminal 1004 of the capacitor 1002.

The current source 1000 is configured to provide a current I for charging the capacitor 1002. Preferably, the current I is proportional to (Vsupply−Vout) or (Vsupply−Vref), so that the duration of the "on" state of the switch IT1 is independent of the value of the supply potential Vsupply.

The switch IT3 is controlled by the signal stain. Specifically, when the circuit 902 (FIG. 9) controls the start of a ramp Ramp1 with the signal start1, the switch IT3 is configured to switch to the "on" state, resulting in the capacitor 1002 charging and the ramp voltage Ramp1 being available across it.

Although not shown in FIG. 10, a device for resetting the ramp Ramp1, such as a device for discharging the capacitor 1002, like a switch connected in parallel with the capacitor 1002, is provided in the ramp generator 904, which is controlled by the signal start1, for example.

In this embodiment, the value of the capacitor 1002 is controlled by the signal Sel. When the signal Sel indicates that the value valmax is equal to the value val1, the capacitor 1002 has a first value C1 and, when the signal Sel indicates that the value valmax is equal to the value val2, the capacitor 1002 has a second value C2. In this example, where the value val2 is greater than the value val1, the value C1 is less than the value C2. Thus, the slope of the ramp Ramp1 is greater when the capacitor 1002 is at value C1 than when the capacitor 1002 is at the value C2, from which it follows that the duration of the "on" state of the switch IT1 is less when the capacitor 1002 has the value C1 than when the capacitor 1002 has the value C2.

In an embodiment, the capacitor 1002 includes a capacitor Cval1 having a first electrode corresponding to the electrode 1004 of the capacitor 1002, and a second electrode connected to the node 102. The capacitor Cval1 has the value C1. In addition, the capacitor 1002 includes a switch IT4 in series with a capacitor Cval2 between the node 102 and the electrode 1004 of the capacitor 1002. The combination in series of the capacitor Cval2 and the switch IT4 is thus connected in parallel to the capacitor Cval1. The capacitor Cval2 has a value such that, when the switch IT4 controlled by the signal Sel is on, the capacitor 1002 has the value C2. In this case, the switch IT4 is on when the value val2 is selected, and off otherwise.

Although a more detailed embodiment of a ramp generator has been described in connection with FIG. 10, the person skilled in the art is able to envisage embodiments of ramp generators 904 and 906 different from those described, but allowing for implementation of the method described in connection with FIGS. 2-6.

More generally, a more detailed embodiment of the circuit CTRL has been described in connection with FIG. 9, in which the durations of the "on" states of the switches IT1 and IT2 are determined by voltage ramp comparisons with a potential or potentials determined by the set value of the potential Vout. The person skilled in the art is able to envisage other embodiments of the circuit CTRL in which the durations of the "on" state of the switches IT1 and IT2 are determined differently, with a voltage-controlled oscillator (VCO), for example, and are modified when the value selected as the maximum value valmax is modified, with these durations of the "on" state increasing or decreasing when the value valmax increases or decreases respectively.

Furthermore, in the exemplary embodiments, implementation modes, and variants previously described in connection with FIGS. 1-10, the maximum value valmax of the current pulses IL is selected from only the two values val1 and val2. However, in other embodiments, the value valmax is selected from any number of values greater than two. From the functional indications given above, implementation of these embodiments is within the ability of the person skilled in the art.

In embodiments, the value valmax may be selected from the value val1, the value val2, and an additional value val3. In an embodiment, the value val3 is greater than the value val2.

Figure 11:
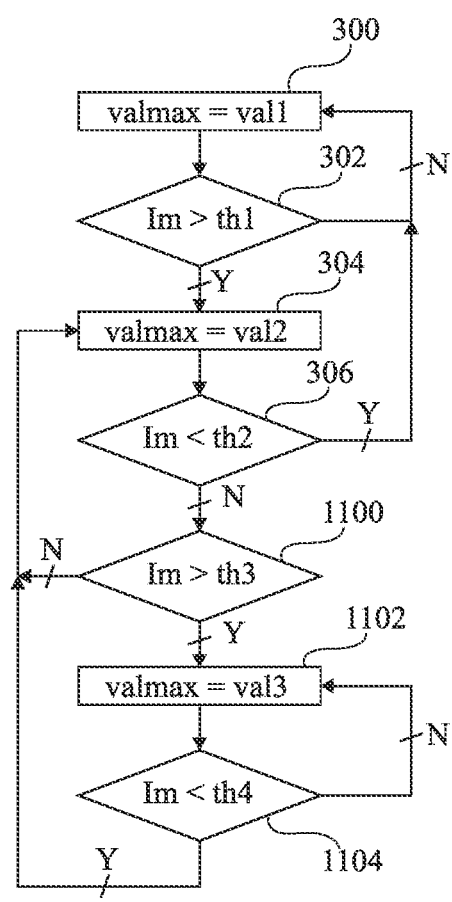
FIG. 11 is a flow chart of an embodiment method.

FIG. 11 shows an alternative embodiment of the method of FIGS. 2 through 4 in the form of a flowchart, where the value valmax is selected from three values, val1, val2, and val3. The method in FIG. 11 is implemented by the circuit CTRL, for example.

Compared to the method of FIG. 3, the method of FIG. 11 further includes selecting the value val3 as the maximum value valmax of the current pulses when the average current Im is greater than a threshold th3 greater than the threshold th1; and selecting the value val2 when the average current Im is less than a threshold th4 greater than the threshold th1 and less than or equal to the threshold th3. Preferably, the threshold th4 is lower (i.e., strictly lower here) than the threshold th3, so that a hysteresis is implemented when switching the value valmax between the values val2 and val3.

Thus, the method of FIG. 11 includes steps 300, 302, 304, and 306, described in connection with FIG. 3, which will therefore not be detailed again here, and further includes steps 1100, 1102 and 1104. Contrary to that been described in connection with FIG. 3, in step 306, when the average current Im is less than the threshold the (output N of step 306), the method continues in step 1100 ("Im>th3" block), consisting of verifying whether the current Im is greater than the threshold th3.

If the current Im is less than the threshold th3 (output N of step 1100), the method continues at step 304 and the value valmax remains equal to the value val2.

If the current Im is greater than the threshold th3 (output Y of step 1100), the method continues at step 1102 (block "valmax=val3").

In step 1102, the value valmax becomes equal to the value val3, or, put differently, the circuit CTRL selects the value val3 as the current maximum value valmax. In other words, the value valmax switches from the value val2 to the value val3.

Step 1102 is followed by step 1104 ("Im<th4" block) in which the circuit CTRL compares the current Im to the threshold th4.

If the current Im is greater than the threshold th4 (output N of step 1104), the method continues at step 1102 and the value valmax remains equal to the value val3.

If the current Im is less than the threshold th4 (output Y of step 1104), the method continues at step 304 where the value valmax becomes equal to the value val2, i.e. switches from the value val3 to the value val2.

Although the case where threshold th4 is lower than threshold th3 has been described in connection with FIG. 11, the person skilled in the art can adapt the above method to the case where the thresholds th3 and th4 are equal.

In an embodiment, the step 1100 may be implemented in a manner similar to that described in connection with FIG. 5. In this case, step 1100, which is implemented while the current valmax is equal to val2, includes: at the end of each current pulse IL, the triggering, by the circuit CTRL, for example, of a temporization temp3 representative of the threshold th3; and the selecting of the value val3, by the circuit CTRL, for example, if a start of the next current pulse IL occurs during the temporization temp3 (output Y of step 1100). Conversely, if the start of the next current pulse IL occurs when the temporization has ended (output N of step 1100), the method continues at step 306 and the value valmax remains equal to the value val2.

Similarly, step 1104 is implemented in a manner similar to that described in connection with FIG. 6, for example. In this case, step 1104, which is implemented while valmax is equal to val3, includes: at the end of each current pulse IL, the triggering, by the circuit CTRL, for example, a temporization temp4 representative of the threshold th4; and the selecting of the value val2, by the circuit CTRL, for example, if a start of the next current pulse IL occurs when the temporization temp4 has ended (output Y of step 1104). Conversely, if the start of the next current pulse IL occurs during the temporization temp4 (output N of step 1104), the method continues at step 1102 and the value valmax remains equal to the value val3.

Adapting the description of FIGS. 1-10 to the method of FIG. 11 is within the scope of the person skilled in the art.

Various embodiments and variants have been described. Those skilled in the art will understand that certain features of these embodiments can be combined and other variants will readily occur to those skilled in the art.

Finally, the practical implementation of the embodiments and variants described herein is within the capabilities of those skilled in the art based on the functional description provided hereinabove. In particular, those skilled in the art are able to determine the values that the maximum value valmax of the current pulses IL can have, the values of the corresponding thresholds, and, when the current Im is estimated by the delay between two successive current pulses IL, the delay durations representative of these thresholds.

Although the description has been described in detail, it should be understood that various changes, substitutions, and alterations may be made without departing from the spirit and scope of this disclosure as defined by the appended claims. The same elements are designated with the same reference numbers in the various figures. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

The specification and drawings are, accordingly, to be regarded simply as an illustration of the disclosure as defined by the appended claims, and are contemplated to cover any and all modifications, variations, combinations, or equivalents that fall within the scope of the present disclosure.

Embodiments have been described in which the value valmax is selected from only two discrete values val1 and val2, or from only three discrete values val1, vla2 and val3. Those skilled in the art will know how to adapt these embodiments to the case where the value valmax is selected only from a plurality of discrete values comprising the values val1 and val2, or only from a plurality of discrete values comprising the values val1, val2 and val3.

What is claimed is:

1. A switched-mode power supply (SMPS) buck converter comprising:
    a first switch coupled between a first node and an internal node of the SMPS buck converter, the first node arranged to receive a supply potential;
    a second switch coupled between the internal node and a second node, the second node arranged to receive a reference potential (GND);
    an inductive element arranged to couple the internal node to an output node of the SMPS buck converter; and
    a control circuit configured to control the first switch and the second switch such that current pulses in the inductive element have a maximum value selected, by the control circuit, from a first value and a second value based on an average current drawn at the output node being less than a second threshold and the average current drawn at the output node being greater than a first threshold, respectively, the second threshold being less than or equal to the first threshold.

2. The SMPS buck converter of claim 1, wherein the maximum value increases in response to an increase in the average current, and wherein the maximum value decreases in response to a decrease in the average current.

3. The SMPS buck converter of claim 1, wherein the first value is less than the second value.

4. The SMPS buck converter of claim 3, wherein the second threshold is less than the first threshold.

5. The SMPS buck converter of claim 3, wherein, in response to selecting the first value, the control circuit is configured to:
    trigger a first temporization being representative of the first threshold at an end of each current pulse; and
    select the second value in response to a start of a next current pulse having occurred during the first temporization.

6. The SMPS buck converter of claim 5, wherein, in response to selecting the second value, the control circuit is configured to:
    trigger a second temporization being representative of the second threshold at the end of each current pulse; and
    select the first value in response to the start of the next current pulse having occurred after the second temporization.

7. The SMPS buck converter of claim 6, wherein a duration of each first temporization is less than a duration of each second temporization, wherein the end of each current pulse corresponds to an opening of the second switch while the first switch is open, wherein the start of the next current pulse corresponds to a closing of the first switch while the second switch is open, wherein the average current is determined by a delay between each two successive current pulses or from control signals of the first switch and the second switch, and wherein the first switch and the second switch are controlled in pulse frequency modulation (PFM).

8. A switched-mode power supply (SMPS) buck converter comprising:
- a first switch coupled between a first node and an internal node of the SMPS buck converter, the first node arranged to receive a supply potential;
- a second switch coupled between the internal node and a second node, the second node arranged to receive a reference potential (GND);
- an inductive element arranged to couple the internal node to an output node of the SMPS buck converter; and
- a control circuit configured to control the first switch and the second switch such that current pulses in the inductive element have a maximum value selected from at least a first value, a second value, and a third value based on an average current drawn at the output node, the third value being greater than the second value, and the second value being greater than the first value.

9. The SMPS buck converter of claim 8, wherein the maximum value increases in response to an increase in the average current, wherein the maximum value decreases in response to a decrease in the average current, and wherein the control circuit is configured to:
- select the second value in response to the average current being above a first threshold; and
- select the first value in response to the average current being less than a second threshold, wherein the second threshold is less than or equal to the first threshold.

10. The SMPS buck converter of claim 9, wherein the control circuit is configured to:
- select the third value in response to the average current being greater than a third threshold, the third threshold being greater than the first threshold; and
- select the second value in response to the average current being below a fourth threshold, the fourth threshold being greater than the first threshold and less than or equal to the third threshold.

11. The SMPS buck converter of claim 10, wherein, in response to selecting the first value, the control circuit is configured to:
- trigger a first temporization being representative of the first threshold at an end of each current pulse; and
- select the second value in response to a start of a next current pulse having occurred during the first temporization.

12. The SMPS buck converter of claim 11, wherein, in response to selecting the second value, the control circuit is configured to:
- trigger a second temporization being representative of the third threshold at the end of each current pulse; and
- select the third value in response to the start of the next current pulse having occurred during the second temporization.

13. The SMPS buck converter of claim 12, wherein, in response to selecting the third value, the control circuit is configured to:
- trigger a third temporization being representative of the fourth threshold at the end of each current pulse; and
- select the second value in response to the start of the next current pulse having occurred after the third temporization.

14. The SMPS buck converter of claim 13, wherein a duration of each first temporization is less than a duration of each second temporization, wherein the end of each current pulse corresponds to an opening of the second switch while the first switch is open, and wherein the start of the next current pulse corresponds to a closing of the first switch while the second switch is open.

15. The SMPS buck converter of claim 14, wherein the first switch and the second switch are controlled in pulse frequency modulation (PFM), wherein the average current is determined by a delay between each two successive current pulses or from control signals of the first switch and the second switch, wherein a duration of an on-state of the first switch at each current pulse is determined by a comparison of a first voltage ramp with a first potential, the first potential determined by a set value of an output potential of the SMPS buck converter, wherein a duration of an on-state of the second switch at each current pulse is determined by a comparison of a second voltage ramp with a second potential determined by the set value, and wherein slopes of the first voltage ramp and the second voltage ramp differ in accordance with the maximum value as selected.

16. A method, comprising:
- selecting, by a control circuit, a maximum value of current pulses from at least a first value and a second value, the current pulses corresponding to an inductive element coupling an internal node of a switched-mode power supply (SMPS) buck converter to an output node of the SMPS buck converter, the selection being done based on an average current drawn at the output node;
- controlling, by the control circuit, a first switch connected between a first node receiving and the internal node, the first node receiving a supply potential; and
- controlling, by the control circuit, a second switch connected between the internal node and a second node, the second node receiving a reference potential (GND), the controlling of the first switch and second switch resulting in the maximum value being equal to the selected value, the maximum value increasing in response to an increase in the average current drawn at the output node, and the maximum value decreasing in response to a decrease in the average current drawn at the output node.

17. The method of claim 16, wherein the first value is less than the second value, the method further comprising:
- selecting, by the control circuit, the second value in response to the average current being above a first threshold; and
- selecting, by the control circuit, the first value in response to the average current being less than a second threshold, wherein the second threshold is less than or equal to the first threshold.

18. The method of claim 17, wherein, in response to selecting the first value, the method further comprising:
- triggering, by the control circuit, a first temporization being representative of the first threshold at an end of each current pulse; and
- selecting, by the control circuit, the second value in response to a start of the next current pulse having occurred during the first temporization.

19. The method of claim 18, wherein, in response to selecting the second value, the method further comprising:
- triggering, by the control circuit, a second temporization being representative of the second threshold at the end of each current pulse; and
- selecting, by the control circuit, the first value in response to the start of the next current pulse having occurred after the second temporization.

20. The method of claim 19, wherein a duration of each first temporization is less than a duration of each second temporization, wherein the end of each current pulse corresponds to an opening of the second switch while the first switch is open, wherein the start of the next current pulse corresponds to a closing of the first switch while the second switch is open, wherein the average current is determined by a delay between each two successive current pulses or from control signals of the first switch and the second switch, and wherein the first switch and the second switch are controlled in pulse frequency modulation (PFM).

21. The SMPS buck converter of claim 1, further comprising a circuit configured to provide the control circuit with a signal indicating that the current in the inductive element is zero.

* * * * *